United States Patent [19]

Varis et al.

[11] 4,318,463

[45] Mar. 9, 1982

[54] DOUBLE CONIC COUPLING APPARATUS

[75] Inventors: Pauli Varis; Juhani Halkola, both of Rauma, Finland

[73] Assignee: Hollming Oy, Finland

[21] Appl. No.: 129,900

[22] Filed: Mar. 13, 1980

[30] Foreign Application Priority Data

Mar. 14, 1979 [FI] Finland ............................... 790868

[51] Int. Cl.³ ..................... F16D 25/06; F16D 13/74
[52] U.S. Cl. ................. 192/85 AB; 192/70; 192/110 R; 192/113 B
[58] Field of Search ............. 192/85 A, 85 AB, 87.1, 192/70, 113 B, 66, 107 M, 110 R

[56] References Cited

U.S. PATENT DOCUMENTS

| | | | |
|---|---|---|---|
| 1,524,231 | 1/1925 | Beilke | 192/70 |
| 1,665,076 | 4/1928 | Tessky | 192/113 B |
| 2,386,478 | 10/1945 | Kraft | 192/70 |
| 3,547,243 | 12/1970 | Lindau et al. | 192/70 |

*Primary Examiner*—George H. Krizmanich

*Attorney, Agent, or Firm*—Steinberg & Raskin

[57] ABSTRACT

Coupling apparatus for rotatably coupling an input shaft to an output shaft includes an outer assembly having a pair of inner conic friction surfaces mounted for rotation with the input shaft, a pair of opposed annular piston members located within the outer assembly defining a space between them, each of the annular piston members being connected to the output shaft and one of a pair of friction elements having outer conic friction surfaces. A pressurized fluid is directed into the space between the annular piston members to move the same away from each other against the force of respective cup-shaped springs whereby the outer friction surfaces of the friction elements engage the inner friction surfaces of the outer assembly to engage the coupling. A pin-fork arrangement is utilized to interconnect the output shaft with each of the annular piston members in a manner such that the output shaft, which is mounted in a bearing housed within the outer assembly, can be centered with respect to the outer assembly.

6 Claims, 3 Drawing Figures

DOUBLE CONIC COUPLING APPARATUS

BACKGROUND OF THE INVENTION

This invention relates generally to rotary friction couplings whereby an output shaft can be coupled for rotation with a rotating input shaft and, more particularly, to a rotary friction coupling having double conic friction surfaces which are selectively engageable to engage the coupling.

Rotary friction couplings having conic friction surfaces for coupling a rotary input shaft to an output shaft are known. For example, such couplings are utilized in drive transmissions for powering a ship's propeller.

Such rotary friction couplings generally comprise a fixed outer part and an inner part mounted for axial movement within the outer part in order to effect engagement and disengagement of the coupling. Such axial movement of the inner part is generally accomplished by means of a gear and associated annular wheel or, alternatively, by means of a plurality of keys slidably located within associated slots. Neither of these arrangements allow or provide for any angular deviation of the shaft from the axis during operation of the coupling. However, since some angular deviations always exist due, for example, to imperfect installation, loading during operation, etc., the inflexible nature of the slidable interconnection between the inner part and outer part often results in undue wear of the slide arrangement of the inner part. Such wear produces metal particles which often get caught in the coupling causing the same to jam as well as producing other kinds of troubles.

Conventional rotary couplings having conic friction surfaces must be manufactured and installed in a manner such that a high degree of concentricity is maintained between the inner and outer parts of the coupling. Thus, it is recognized that even a slight degree of eccentricity between the outer and inner parts will result in losses in the capacity of the coupling to transmit torque.

It is also known that conventional rotary couplings of the type described above operate in less than a satisfactory manner when positioned in a vertical orientation.

SUMMARY OF THE INVENTION

Accordingly, one subject of the present invention is to provide a new and improved rotary friction coupling of the double conic type.

Another object of the present invention is to provide a new and improved rotary friction coupling of the double conic type wherein the output shaft is substantially central with respect to the coupling but where some angular deviation of the shafts is permitted which will not result in undue wear of the coupling.

Still another object of the present invention is to provide a new and improved rotary friction coupling of the double conic type wherein some eccentricity of the inner and outer parts of the coupling is permitted without losses in the capacity of the torque transmitted by the coupling.

Briefly, in accordance with the present invention, these and other objects are attained by providing a coupling which includes an outer assembly mounted for rotation with the input shaft having a pair of inner conic friction surfaces, a pair of opposed annular piston members located within the outer assembly defining a space between them, each of the annular piston members being connected to the output shaft and one of a pair of friction elements having outer conic friction surfaces. A pressurized fluid is directed into the space between the annular piston members to move the same away from each other against the force of respective cup-shaped springs whereby the outer friction surfaces of the friction elements engage the inner surfaces of the outer assembly to engage the coupling.

In order to provide that the output shaft will be substantially centered with respect to the outer assembly of the coupling, the interconnection between the annular piston members and the output shaft is accomplished by means of a pin-fork arrangement and, additionally, the output shaft is mounted in bearing structure which allows the output shaft to be substantially central.

In a coupling constructed in accordance with the present invention, some angular deviations in the position of the output shaft are permissible for reasons that the friction elements having the outer conic friction surfaces can freely assume a position determined by the orientation of the inner friction surfaces of the outer assembly due to the use of a cardan joint which functions to interconnect the output shaft to the piston members. Of course, this improves the contact between the respective friction surfaces and, therefore, improves the torque transfer capacity.

Further, some degree of eccentricity between the inner and outer elements of the coupling can be accommodated by a coupling constructed in accordance with the present invention. Thus, the output shaft is rotatably mounted in bearing structure fixed within the outer assembly, which bearing functions solely as an axial bearing which supports the weight of the elements located within the outer assembly and the shaft when the coupling is disengaged. This bearing permits some movement of the shaft in the radial direction so that in this manner, the conic friction elements can be centered relative to the outer assembly despite the angular displacement of the shaft. Further, when the coupling operates in its horizontal configuration, the bearing will carry radial loads generated by the inner elements of the coupling. Still further, the bearing prevents the friction elements from engaging the outer assembly of the coupling when the coupling is disengaged.

As noted above, cup-shaped springs are utilized to normally urge the annular piston members towards each other whereby the coupling is in its disengaged mode. Such cup-shaped springs are advantageous in that their use permits the friction elements to be more easily positioned than if helical springs were utilized. Further, such cup-shaped springs do not require as much space as helical springs or the like.

Although a coupling constructed in accordance with the present invention typically functions as a so-called "dry" coupling, when the pressurized fluid utilized to disengage the coupling comprises hydraulic oil, the advantages of a "wet" coupling can be achieved. More particularly, the friction surfaces of the outer assembly and friction elements can be cleaned, i.e., rinsed of any undesired impurities of particulate matter which might accumulate on the surfaces due to centrifugal force during operation. Such cleaning can be further facilitated by providing the outer friction surfaces of the friction elements with grooves.

In connection with the above, it is noted that the utilization of a cardan joint construction for the coupling of the present invention considerably reduces the amount of impurities caused by wear.

Further, the orientation of the coupling of the present invention can be freely chosen since the coupling operates as well when oriented vertically, horizontally, or in any intermediate orientation.

It has been found desirable to form the various friction surfaces of a bronze cast iron in order to avoid any possibility of the coupling jamming or seizing during operation.

The coupling of the present invention can also be adapted to operate as an overload protection clutch. More particularly, the maximum presure of the pressurized fluid which causes the coupling to become engaged can be limited by means of a device provided externally to the system.

Further, the coupling of the present invention is especially adapted to couple input and output shafts which extends from the coupling coaxially in the same direction. Of course, other arrangements are also possible.

DESCRIPTION OF THE DRAWINGS

A more complete appreciation of the present invention and many of the attendant advantages thereof will be obtained by reference to the following detailed description when considered in connection with the accompanying drawing in which.

DESCRIPTION OF THE PREFERRED EMBODIMENTS

Figure 1:
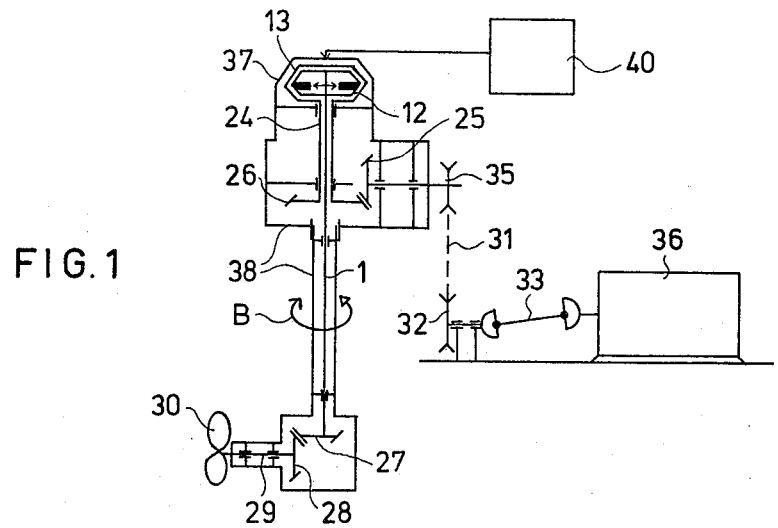
FIG. 1 is a schematic illustration of a drive mechanism for a ship's propeller which includes the friction coupling of the present invention.
Figure 2:
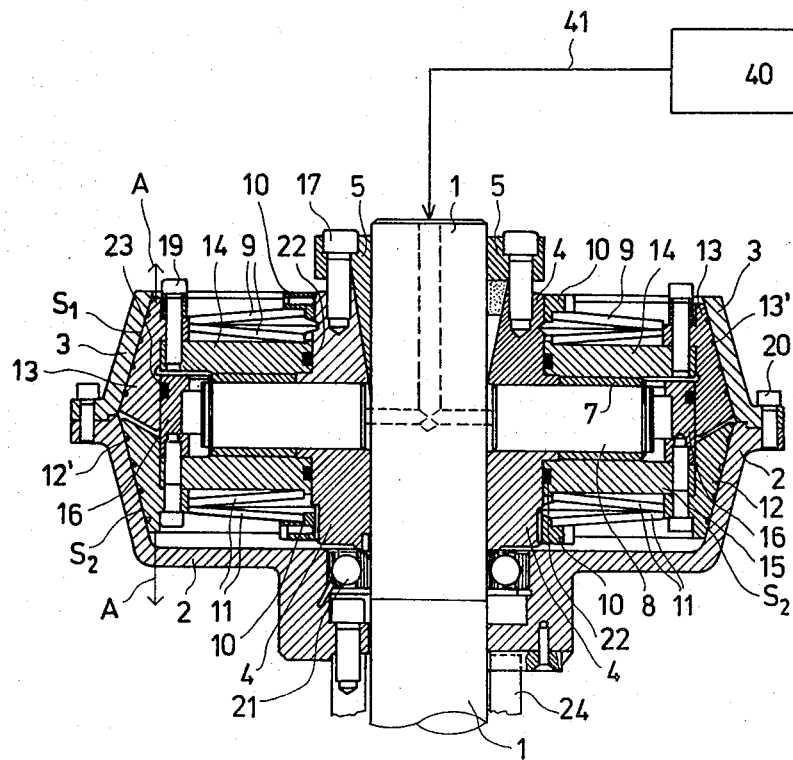
FIG. 2 is a side elevation view in section of a friction coupling according to the present invention.

Referring now to the drawings wherein like reference characters designate identical or corresponding parts throughout the several views, and more particularly to FIG. 1, a drive transmission for a ship is illustrated which includes the friction coupling of the present invention. Of course, it is understood that the friction coupling of he present invention may be utilized in drive transmissions in other applications although the coupling is especially suited for such use. Thus, the drive transmission illustrated in FIG. 1 includes an engine 36 which drives the propeller 30 through the illustrated transmission. Thus, the engine 36 drives a V-belt pulley 32 through a cardan shaft 33, the V-belt pulley 32 being connected to V-belt pulley 35 through a V-belt 31. The pulley 35 drives a bevel gear 25 which rotates a tubular input shaft 24 through a bevel gear 26 which is driven by gear 25. The tubular input shaft 24 is supported by suitable bearings on the frame 38 of the drive mechanism. The tubular shaft 24 is connected at its upper end to the outer assembly of the coupling of the present invention (members 2 and 3 as seen in FIG. 2) so that the outer assembly of the friction coupling rotates together with the input shaft 24. An output shaft 1 which extends coaxially within the input shaft 24 is connected at its upper end to the elements of the friction coupling located within the outer assembly as described in detail hereinbelow. Thus, the output shaft 1 passes through the tubular shaft 24 so that when the output shaft is coupled to the input shaft, rotation of the latter will result in rotation of the output shaft 1 so that the propeller 30 of the ship is driven through a bevel gear 27 connected to the lower end of output shaft 1 which engages a bevel gear 28 which is connected to the shaft 29 of propeller 30. The lower portion 38 of the frame of the drive mechanism is pivotally mounted so as to be rotatable in the direction of arrow B in order to steer the ship.

Figure 3:
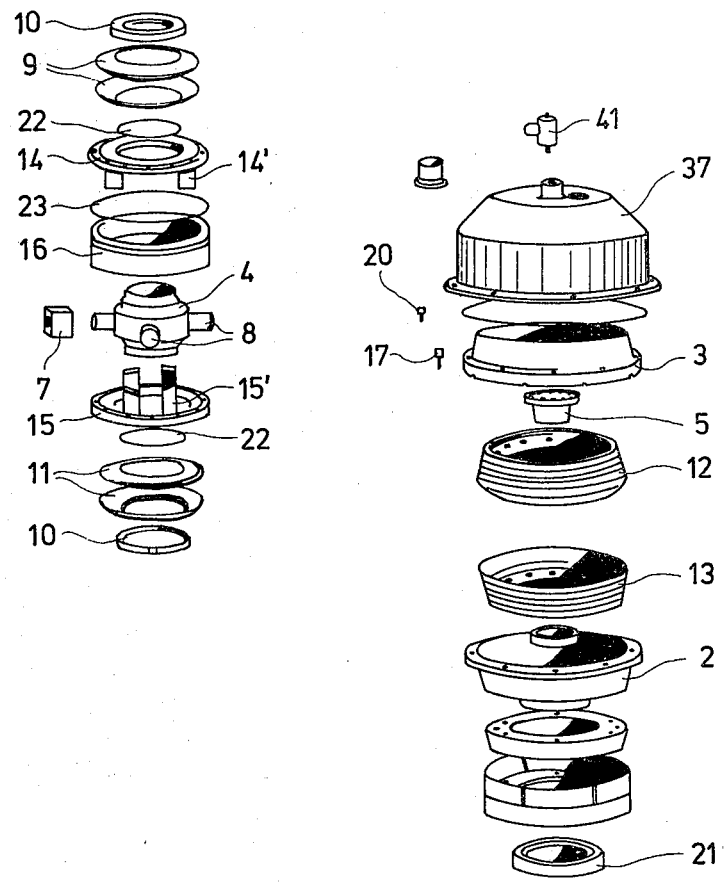
FIG. 3 is an exploded view of the friction coupling of the present invention illustrated in FIG. 2.
Figure 3:
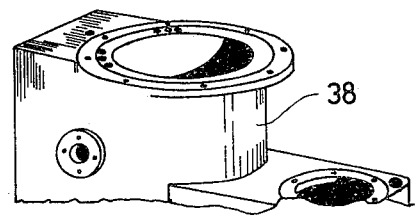

Reference is now made to FIGS. 2 and 3 which illustrate the detailed construction of one embodiment of the friction coupling in accordance with the present invention. The friction coupling is installed within a housing 37 (FIGS. 1 and 3) which is affixed to the drive mechanism 38. The friction coupling includes an outer assembly comprising members 2, 3, each of which includes an inner friction surface having a conic configuration. The members 2, 3 are affixed to each other such as by bolts 20 at their respective bases and the outer assembly is mounted for rotation within the housing 37 together with the input shaft 24 as described above.

The friction coupling includes elements located within the interior of the outer assembly defined by the inner friction surfaces of members 2 and 3. Thus, a cardan joint 4 is fastened to the upper end of the shaft 1 by means of a conical sleeve 5 and bolts 17. Two pairs of pins 8 are affixed to cardan joint 4, respective pairs of pins 8 extending along radial axes which are mutually perpendicular to each other. A slide 7 having a square cross-section is slidably located over a respective one of each of the pins 8.

A pair of substantially annularly shaped pistons 14, 15 are located within the outer assembly 2, 3 such that each annular piston is positioned on a respective side of the slide 7 so that as seen in FIGS. 2 and 3, annular piston 14 is located above the pins 8 while annular piston 15 is located below the same. As seen in FIG. 3, the annular pistons 14, 15 are each provided with forks 14', 15' respectively, which are directed towards each other so as to extend between the slides 7 located over pins 8. In this manner, the annular pistons 14, 15 are rotatably engaged with the cardan joint 4 which is affixed to the shaft 1 as described above.

The annular pistons 14, 15 are normally urged inwardly, i.e., towards each other, by respective cup-shaped springs which are located outwardly of each of the respective piston members. More particularly, as seen in FIGS. 2 and 3, the upper annular piston 14 is normally urged downwardly from above by means of two opposed cup-shaped springs 9 (FIG. 3) which are supported at their inner edges by means of a ring 10. Similarly, the lower annular piston 15 is normally urged upwardly by two opposed cup-shaped springs 11 which are also supported by means of a ring 10.

Each of the annular pistons 14, 15 is provided with an internal groove in which an O-ring 22 is seated which functions to seal the inner surface of each of the annular pistons against the cylindrical surface of the cardan joint 4. An annular member 16 is located between the pistons 14, 15 so that its rim engages the peripheral regions of the respective pistons. An O-ring 23 is provided on the exterior surface of member 16 so that in this manner, a sealed interior space is defined between the annular pistons 14, 15.

A pair of friction elements 12, 13 are located within the interior of the outer assembly 2, 3. Each friction element has an outer conic friction surface $S_1$, $S_2$, respectively, which substantially conforms to the configuration of the inner friction surfaces formed on the outer elements 2, 3. As seen in FIG. 2, the lower conic friction element 12 is fastened to the lower annular piston 15 by means of bolts 19 and, similarly, the upper conic friction element 13 is fastened to the upper annular piston 14 by bolts 19.

An axial passage is formed in the shaft 1 which extends from its upper end to a location radially aligned with the interior space defined between the annular pistons 14, 15 and radial passages communicate the axial passage with the space. In this manner, a pressurized fluid, such for example as hydraulic oil, can be directed through the channels into the inter-piston space.

The output shaft 1 is rotatably supported by means of a bearing 21 which is housed in the outer member 2 of the outer assembly of the coupling. The bearing 21 is so constructed and is mounted in a manner such that it functions solely as an axial bearing which supports the weight of the inner elements of the coupling as well as the shaft 1 when the coupling is disengaged. However, bearing 21 allows for a certain amount of movement of the shaft 1 in a radial direction so that when the coupling is disengaged, the bearing 21 will tend to mutually center the mating inner and outer elements 3, 13 and 2, 12, respectively, so as to maintain the mating friction surfaces $S_1$, $S_2$ disengaged from the inner friction surfaces of elements 2, 3 under the inward forces of cup-shaped springs 9, 11. Thus, the cup-shaped springs normally urge the annular piston members 14, 15 inwardly to provide the forces by which the coupling is disengaged.

The dimensions of the bearing 21 are such that the fit between the shaft 1 and the inner ring of the bearing 21 as well as the fit between the outer ring of the bearing 21 and the element 2 in which the same is mounted are looser than is conventional. In this manner, the bearing 21 allows for a certain degree of movement of the shaft 1 in its radial direction. Rotation of the inner and outer rings of the bearing 21 is prevented by conventional means, such as stop pins.

The friction coupling of the present invention operates as follows. When it is desired to engaged the coupling, a pressurized fluid is directed from a source 40 through pipe 41 into the channels formed in the shaft so that in this manner, the fluid under pressure is directed into the space defined between the annular pistons 14, 15. As the pressurized fluid enters into the space, the annular pistons 14, 15 are urged outwardly, i.e., away from each other, in the direction of arrow A whereupon the outer conic friction surfaces $S_1$, $S_2$ of the friction elements 12, 13 engage the inner conic friction surfaces of the outer elements 2, 3. In this manner, the output shaft 1 is rotatably connected to the input shaft 24 through the outer elements 2, 3, the friction elements 12, 13, the annular pistons 14, 15, the pin-fork arrangement 8, 14', 15' and cardan joint 4. When the pressure on the fluid in the space between the annular pistons is released, the annular pistons are forced inwardly under the urging of cup-shaped springs 9, 11 so as to disengage the coupling.

The utilization of cup-shaped springs 9, 11 is particularly advantageous as the same tend to position the friction elements 12, 13 in a more even manner than would be possible utilizing other types of springs, e.g., helical springs. Further, the cup-shape of the springs, 9, 11 considerably reduces the space requirements and simplify the construction of the coupling.

In order to prevent the possibility of the friction elements seizing to the inner friction surfaces of the outer elements 2, 3, it has been found advantageous to form the friction surfaces $S_1$, $S_2$ of bronze cast iron.

In order to provide for a self-cleaning action, the friction elements 12, 13 are preferably formed with grooves 12', 13', respectively, along their friction surfaces.

The friction coupling of the present invention can also operate as an overload protection clutch. In this connection, conventional apparatus, shown schematically as 42, can be associated with the pressurized fluid source 40 for limiting the maximum pressure of the fluid in order to protect the transmission unit against overloading.

According to another feature of the present invention, one or more openings or holes 43 and 44 are preferably provided in the outer elements 2, 3 of the outer assembly of the coupling through which pressurized oil can be directed so as to provide lubricant on the friction surfaces $S_1$, $S_2$ in order to clean the surfaces. In this connection, it is noted that even though the coupling of the present invention is a "dry" type coupling, the provision of such drain holes normally associated with "wet" type couplings has proved advantageous.

As seen in the drawings, the input and output shafts 24, 1, extends from the coupling in the same direction in a coaxial manner. However, it is understood that the friction coupling according to the present invention can be utilized in connection with transmissions in which the input and output shafts extend in opposite directions from each other as is conventional.

Obviously, numerous modifications and variations of the present invention are possible in the light of the above teachings. It is therefore to be understood that within the scope of the appended claims, the invention may be practiced otherwise than as specifically disclosed herein.

What is claimed is:

1. Coupling apparatus for rotatably coupling an input shaft to an output shaft of the type including double conic friction surfaces, comprising:
   an outer assembly mounted for rotation with the input shaft having a pair of inner conic friction surfaces defining the interior of said outer assembly;
   a pair of substantially annularly-shaped piston members located within said outer assembly in opposed relationship to define between them a substantially sealed space;
   means for interconnecting each of the annular piston members and the output shaft;
   a pair of friction elements having outer conic friction surfaces located within said outer assembly;
   means for interconnecting each of the annular piston members to a respective one of said friction elements;
   a pair of cup-shaped springs located within said outer assembly, each of said cup-shaped springs being in operative engagement with a respective one of said annular piston members to normally maintain said piston members in respective positions whereby said inner and outer friction surfaces are disengaged, said cup-shaped springs further serving to center said friction elements;
   means for directing a fluid under pressure into the space between said annular piston members to move the same away from each other together with respective ones of said friction elements connected thereto against the force of said cup-shaped springs, whereby said outer friction surfaces of said friction elements engage said inner friction surfaces of said outer assembly to engage said couplings; and wherein said means for interconnecting each of the annular piston members in the output shaft includes a plurality of pins associated with one of said annular piston members and output shaft and a fork arrangement associated with the other of said annular piston members and output shaft in operative engagement with said pins, and wherein the output shaft is rotatably supported by bearing means housed in said outer assembly;

whereby said pin and fork arrangement and bearing means permit the output shaft to be centered with respect to the outer assembly.

2. Apparatus as recited in claim 1 wherein the outer conic friction surfaces of said friction elements have grooves formed therein for maintaining said inner and outer friction surfaces free of dirt and the like.

3. Apparatus as recited in claim 1 wherein said means for directing the pressurized fluid into the space between the annular piston members includes means for limiting the extent to which the fluid is pressurized so as to protect the coupling against overloads.

4. Apparatus as recited in claim 1 wherein said means for interconnecting each of the annular piston members and the output shaft comprise a cardan joint.

5. Apparatus as recited in claim 1 wherein at least one opening is provided in said outer assembly communicating with said friction surfaces whereby a pressurized fluid can be directed onto said friction surfaces to clean the same.

6. Apparatus as recited in claim 5 wherein said pressurized fluid comprises hydraulic oil.

* * * * *